(12) United States Patent
Clark et al.

(10) Patent No.: US 7,188,959 B2
(45) Date of Patent: Mar. 13, 2007

(54) LAMP RECEIVER FOR USE IN PROJECTOR SYSTEMS

(75) Inventors: Stephan R. Clark, Albany, OR (US); Eugene Buican, Cordova, TN (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 274 days.

(21) Appl. No.: 10/909,583

(22) Filed: Aug. 2, 2004

(65) Prior Publication Data

US 2006/0023170 A1 Feb. 2, 2006

(51) Int. Cl.
*G03B 21/20* (2006.01)
*F21V 21/00* (2006.01)

(52) U.S. Cl. .................. 353/119; 353/87; 348/794; 362/416; 362/365

(58) Field of Classification Search .................. 353/87, 353/119, 97; 349/58, 61; 348/798, 794; 362/410, 416, 419, 365; G03B 21/20; F21V 21/00
See application file for complete search history.

(56) References Cited

U.S. PATENT DOCUMENTS

| | | | |
|---|---|---|---|
| 5,855,488 A * | 1/1999 | Heintz et al. ............... 439/310 |
| 6,056,405 A | 5/2000 | Heintz et al. |
| 6,089,730 A * | 7/2000 | Machii ........................ 362/293 |
| 6,155,687 A | 12/2000 | Peterson |
| 6,179,456 B1 | 1/2001 | Nakamura et al. |
| 6,428,198 B1 | 8/2002 | Saccomanno |
| 6,471,356 B1 | 10/2002 | Gohman et al. |
| 7,059,728 B2 * | 6/2006 | Alasaarela et al. ........... 353/94 |
| 2002/0018186 A1 | 2/2002 | Sea-Huang et al. |
| 2002/0080612 A1 * | 6/2002 | Ozawa et al. ................ 362/268 |
| 2003/0123031 A1 | 7/2003 | Nelson et al. |
| 2003/0151920 A1 * | 8/2003 | Shin ........................... 362/282 |

FOREIGN PATENT DOCUMENTS

| FR | 2 836 984 A | 9/2003 |
|---|---|---|
| JP | 2002-258404 | 9/2002 |

* cited by examiner

*Primary Examiner*—W. B. Perkey
*Assistant Examiner*—Andrew Sever

(57) ABSTRACT

A lamp receiver includes a first member, and a datum structure having a plurality of first reference surfaces for alignment with respect in a first direction, a plurality of second reference surfaces for alignment in a second direction, and at least one third surface for alignment in a third direction. The first reference surfaces are formed on the first member.

30 Claims, 12 Drawing Sheets

LAMP RECEIVER FOR USE IN PROJECTOR SYSTEMS

BACKGROUND

Digital projectors, such as digital micro-mirror device (DMD) and liquid crystal device (LCD) projectors, project high quality images onto a viewing surface. Both DMD and LCD projectors utilize high intensity lamps and reflectors to generate the light needed for projection. Light generated by the lamp is concentrated as a 'fireball' that is located at a focal point of a reflector. Light produced by the fireball is directed into a projection assembly that produces images and utilizes the generated light to project the image onto a viewing surface.

The combination of the lamp and reflector is often referred to as a light engine. Projector systems often include a lamp receiver for coupling the light engine to the projector system. If the light engine is not properly aligned with the projector system, less of the light produced by the light engine is utilized by the projector system in projecting the image. Thus, the image projected has a relatively lower quality in terms of brightness.

As a result, efforts have been directed at ensuring that a lamp holder is properly oriented and aligned with respect to the projector system. One prior solution consists of a lamp receiver with wedged slides that have locating pins on one side. The pins are used to center the lamp holder in one direction and the slides are used to align the tilt and offset. The accuracy of such a lamp receiver is determined, at least in part, by independently formed features that are then assembled.

Each part may be formed with a certain degree of accuracy. The accuracy with which the part can be formed is known as a tolerance. For example, if a part can accurately be formed within +/−0.001 inches of the idealized part shape, it has a tolerance of 0.001 inches. If four such parts are assembled, then the corresponding accuracy of the part is additive, such that the tolerance of the assembly is no more accurate than 0.004 inches in addition to the tolerance associated with putting the assembly together.

As a result, the accuracy of the lamp receiver discussed above depends on the accuracy of each of the independently formed parts and the accuracy of the assembly. The total of these tolerances may become sufficiently large that the image quality suffers. In addition, the formation of such lamp receivers can be time consuming and hence relatively expensive.

SUMMARY

A lamp receiver includes a first member, and a datum structure having a plurality of first reference surfaces for alignment with respect in a first direction, a plurality of second reference surfaces for alignment in a second direction, and at least one third surface for alignment in a third direction. The first reference surfaces are formed on the first member

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

Figure 1:
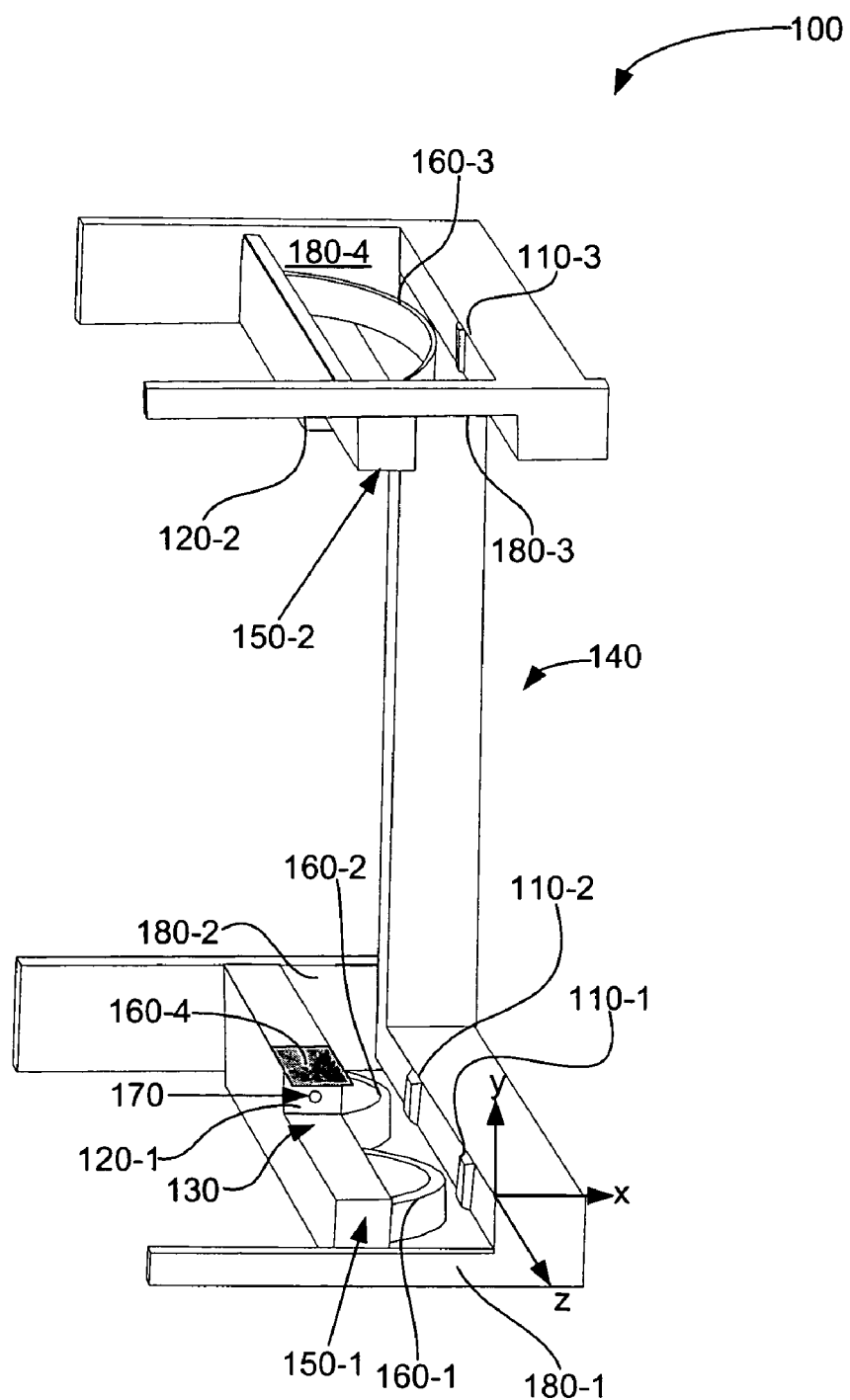
FIG. 1 illustrates a perspective view of an exemplary lamp receiver.

The present method and apparatus provide for reliable, repeatable, and accurate alignment of a lamp holder to a projector system through the use of a datum structure on a lamp receiver. As discussed, projector systems use lamps to project images onto a screen or other viewing surface. These lamps, together with reflector assemblies, are frequently coupled to lamp holders to allow for easier and safer handling of the lamps. Lamp holders, with lamps and reflectors attached thereto, are frequently referred to as light engines. Light engines are coupled to the projector system through a lamp receiver. The lamp receiver ensures that the lamp is properly aligned to maximize the operating efficiency of the projector system.

The features that form the datum structure are orthogonal to each other and are formed directly on the lamp receiver. By forming the datum features directly on the lamp receiver, the build up of tolerances associated with multiple, independently formed features that are then assembled is minimized. Further, the datum features may lie in orthogonal planes. When the datum features are formed, the most accurate and repeatable pathways for machine tools are often along orthogonal planes. As a result, the orthogonal configuration of the datum structure allows for more repeatable formation of datum features.

A lamp assembly may thus be placed in and removed from a projector system having a datum structure multiple times without substantially changing the alignment of the lamp assembly with respect to the projector system while the lamp assembly is coupled thereto. The datum structure also minimizes the effects of torque lockdown and thermal expansion.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

In general, an object is able to move with six independent degrees of freedom. For example, if a rectangular coordinate system is chosen, an object may translate about the x-axis, the y-axis, and the z-axis. This translation represents three degrees of freedom. The other three degrees of freedom include rotation about the x-axis, the y-axis and/or the z-axis. Datums are known references used to constrain movement of an object through these degrees of freedom. A set of datum features used to constrain the movement or alignment of a part is known as a datum structure. If the number of datum features used to constrain the degrees of freedom is equal to the number of degrees of freedom, that structure is said to be kinematic.

FIG. 1 illustrates a partial perspective view of a lamp receiver (100) having a plurality of datum features formed thereon. These datum features define a datum structure. The datum structure helps ensure that when a corresponding part, such as a lamp holder, is coupled to the lamp receiver (100), the part is properly aligned.

For ease of reference the following description is made with reference to an X, Y, and Z coordinate system. This system is described with reference to the origin being at the center of a reflector opening, where the z axis represents the direction of insertion. Although, the X, Y, and Z axis are described herein as orthogonal (such as in rectangular coordinates), other axes could be used that are non-orthogonal such as with a cylindrical or polar coordinate system.

The datum references will be designated according to the direction of motion they constrain. For example, the reference pads that constrain motion of a component in the x-direction will be designated as x-axis reference pads, the reference pads that constrain motion of a component in the z-direction will be designated as z-axis reference pads, etc.

The datum structure includes a plurality of datum pads. These datum surfaces include x-axis reference pads (110-1, 110-2, 110-3); z-axis reference pads (120-1, 120-2); and a y-axis reference pad (130). These six reference pads fully constrain the alignment of a component that is placed in simultaneous contact with each of the pads.

The second guide members (150-1, 150-2) also include a plurality of springs (160-1, 160-2, 160-3 and 160-4) coupled thereto for maintaining a component coupled to the lamp receiver (100) in contact with each of the pads. Further, the second guide members (150) each have a mounting hole (170) defined therein. The mounting holes (170) allow a component coupled to the lamp receiver (100) to be secured thereto with fasteners, such as screws. As the screws are tightened the torque is resisted by the x-axis reference pads (110-1, 110-2, 110-3). Thus, for a component to move from its initial alignment, that component would have to be distorted. The component may be made of suitable materials and/or include torque limits to minimize such distortion.

The three x-axis reference pads (110-1, 110-2, 110-3) are located on a first guide member (140), which will be discussed in more detail with reference to FIG. 2. The two z-axis reference pads (120-1, 120-2) and the y-axis reference pad (130) are located on second guide members (150-1, 150-2). The second guide members (150-1, 150-2) are coupled to the first guide member (140) by a plurality of cross members (180-1, 180-2, 180-3, 180-4) and will be discussed in more detail beginning with reference to FIGS. 3–4.

Figure 2:
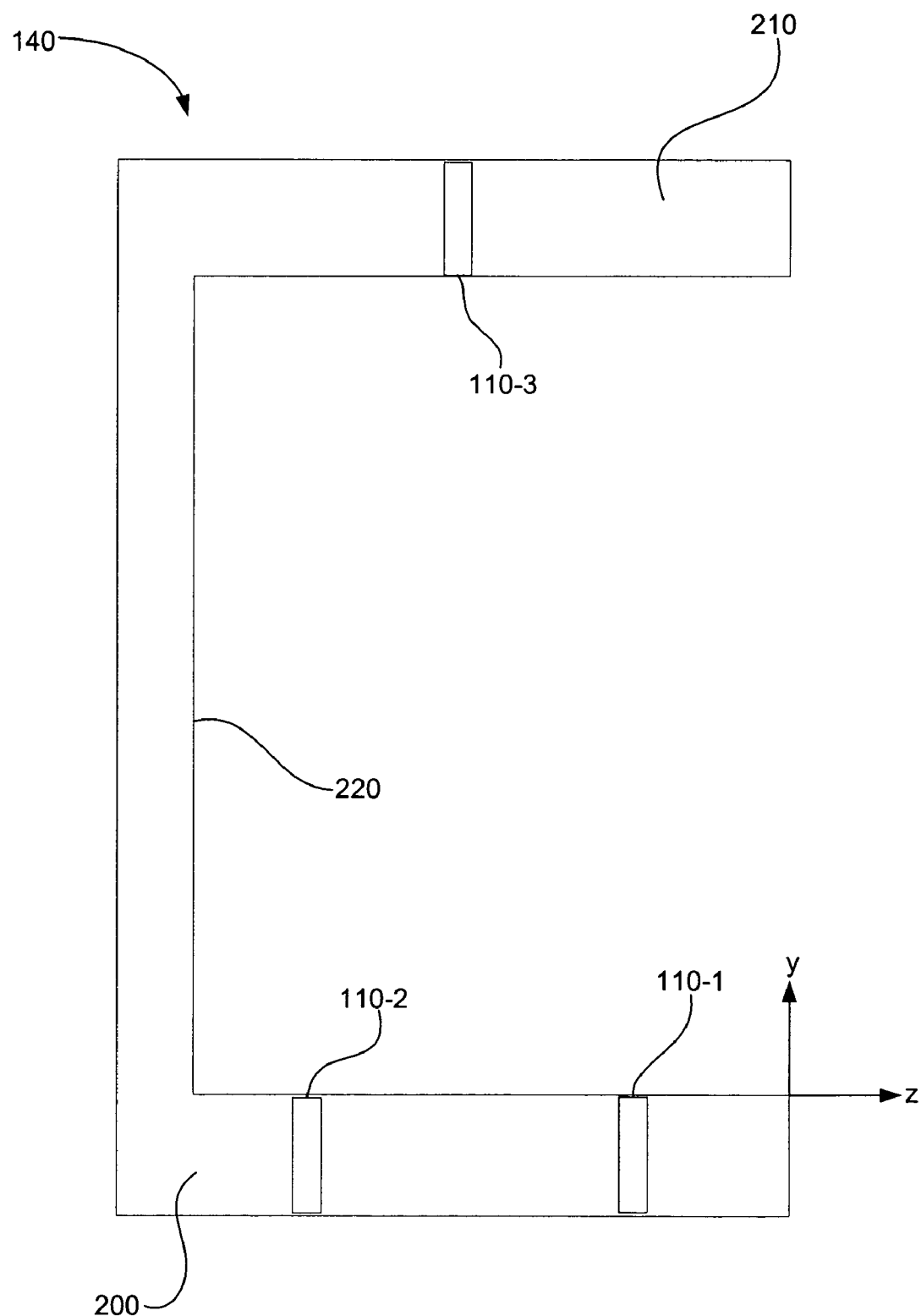
FIG. 2 illustrates a partial view of the exemplary lamp receiver shown in FIG. 1.

FIG. 2 illustrates the first guide member (140) isolated from the rest of the lamp receiver (100; FIG. 1). The first guide member (140) has a lower member (200) and an upper member (210) connected by a connecting member (220). In the exemplary first guide member (140) shown, two of the x-axis reference pads (110-1, 110-2) are located on the lower member (200) while the third x-axis reference pad (110-3) is on the upper member (210). The x-axis reference pads (110-1, 110-2, 110-3) may be formed directly on the first guide member (140) to maximize the accuracy of locating a component placed in contact therewith.

The x-axis reference pads (110-1, 110-2, 110-3) define a plane, as any three points define a plane. This plane is substantially parallel to the plane designated as the y-z plane according to the chosen coordinate system. If a component is placed in simultaneous contact with the x-axis reference pads (110-1, 110-2, 110-3), the motion of the component is constrained with respect to translation along the x-axis. In addition, if the first guide member is rigid or can be modeled as such, the component in simultaneous contact with the x-axis reference pads (110-1, 110-2, 110-3) is constrained from rotating about axes parallel to either the y-axis or the z-axis. Consequently, such a component would be limited to translation parallel to the y and/or z axes and/or about axes parallel to the x-axis.

Accordingly, a component in contact with only the three x-axis reference pads (110-1, 110-2, 110-3) is constrained with respect to three degrees of freedom while remaining free to move about the remaining three degrees of freedom, which include translation parallel to the z and y axes and rotation about axes parallel to the x-axis. The constrained degrees of freedom include the translation in the x-direction and rotation about axes parallel to the y and z axes. By also placing such a component in simultaneous contact with the two z-axis reference pads (120-2, 120-3), that component is then constrained with respect to translation parallel to the x-axis.

Figure 3:
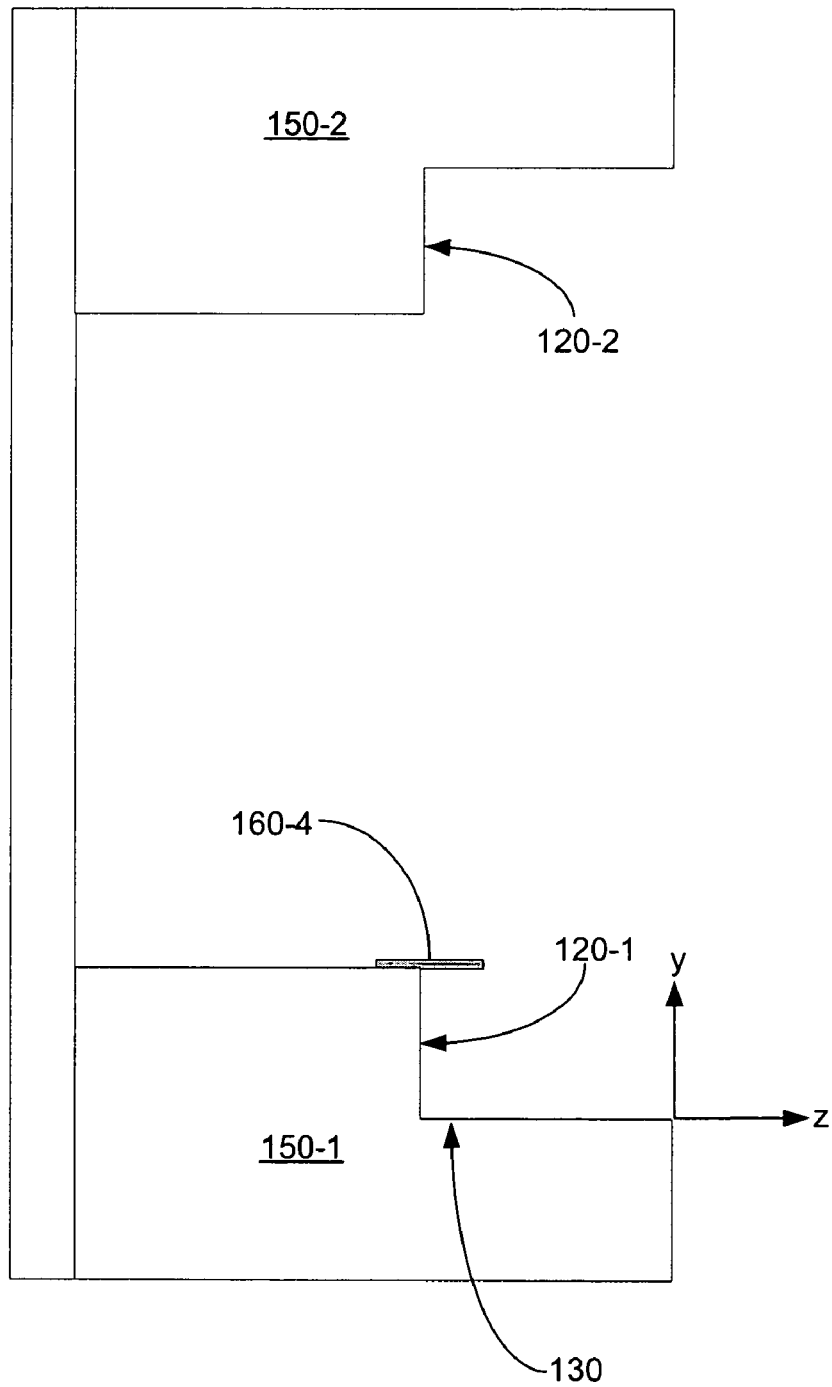
FIG. 3 illustrates a partial view of the exemplary lamp receiver shown in FIG. 1.

FIG. 3 illustrates a side view of the lamp receiver (100), including the second guide members (150-1, 150-2). The z-axis reference pads (120-1, 120-2) are formed directly on the second guide members (150-1, 150-2) to minimize tolerance stack. When a component is simultaneously placed in contact with each of the z-axis reference pads, movement of the component parallel to the z-axis is thus constrained.

Rotation of a component about axes parallel to the x-axis is constrained because of the configuration of the z-axis reference pads (120-1, 120-2). A line is defined by the z-axis reference pads (120-1, 120-2), as a line is defined by any two points. The line between the z-axis reference pads (120-1, 120-2) is substantially parallel to the y-axis and normal to both the z-axis and the x-axis. The orientation of this line is substantially fixed because the relative position of the z-axis reference pads (120-1, 120-2) is also substantially fixed. Accordingly, a component placed in contact with the z-axis reference pads (120-1, 120-2) is constrained with respect to rotation about axes parallel to the x-axis.

Consequently, placing a component in simultaneous contact with z-axis reference pads constrains that component with respect to translation parallel to the z-axis and with respect to rotation about axes parallel to the x-axis. If the component is also placed in contact with the x-axis reference pads (110-1, 110-2, 110-3) as discussed with reference to FIG. 2, the component will be constrained with all degrees of freedom except translation about the y-axis.

FIG. 3 also illustrates the y-axis reference pad (130) formed directly on the lower second guide member (150-1). The y-axis reference pad (130) contacts a small surface or point of a component placed in contact with the lamp receiver (100). Placing a point or surface with the y-axis reference pad (130) is sufficient to constrain movement of that point or surface parallel to the y-axis. If a component, of which the surface or point is a part, is also simultaneously in contact with the x-axis reference pads (110-1, 110-2, not shown in FIG. 4, 110-3) and the z-axis reference pads (120-1, 120-2), movement of the component will be fully constrained. Springs and/or screws may be used to help ensure that a component coupled to the lamp receiver (100) is in simultaneous contact with each of the datum reference pads and thus has its movement fully constrained in an aligned position.

Figure 4:
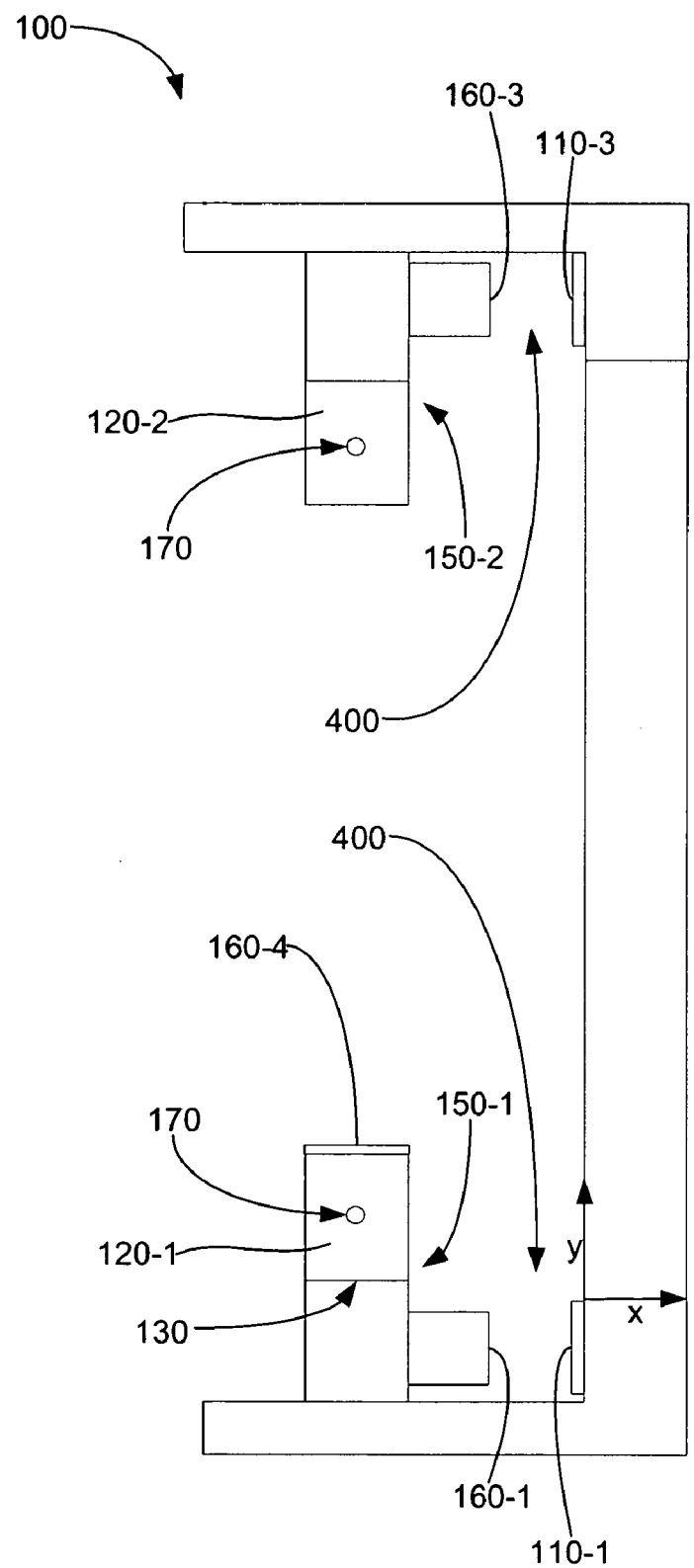
FIG. 4 illustrates a partial view of the exemplary lamp receiver shown in FIG. 1.

FIG. 4 is a front view of the lamp receiver (100), including the springs (160-1, 160-2, not shown in FIG. 4, 160-3 and 160-4) coupled to the second guide members (150-1, 150-2) for maintaining a component coupled to the lamp receiver (100) in contact with each of the reference pads.

Springs (160-1, 160-2, 160-3) ensure that a component coupled to the lamp receiver (100) remains in contact with the x-axis reference pads (110-1, 110-2, 110-3). In particular, when no component is coupled to the lamp receiver (100), as shown, gaps (400) exists between the lower springs (160-1, 160-2) and the lower x-axis reference pads (110-1, 110-2) and the upper spring (160-3) and the upper x-axis reference pad (110-3).

When a component that is slightly thicker than the lower gap (400) is coupled to the lamp receiver, the springs (160-1, 160-2, 160-3) are compressed slightly as the component occupies the gap (400). This compression of the springs (160-1, 160-2, 160-3) against the component causes the springs to exert biasing forces that act to maintain the component in contact with the x-axis reference pads (110-1, 110-2, 110-3).

The second guide member (150-1, 150-2) also includes a plurality of mounting holes (170). Further, the second guide members (150-1, 150-2) each have a mounting hole (170) defined therein. The mounting holes (170) allow a component coupled to the lamp receiver (100) to be secured thereto with fasteners, such as screws or bolts. The relative position of x-axis reference pads (110-1, 110-2, 110-3) with respect to mounting holes (170) minimizes the effect on the relative alignment of the component due to the torque applied to secure the fasteners because the x-axis reference pads (110-1, 110-2, 110-3) oppose the torque. The last spring (160-4) helps ensure that a component coupled to the lamp receiver (100) remains in contact with the y-axis reference pad (130). An exemplary lamp holder component will now be discussed in more detail, followed by a discussion of the interaction between locating surfaces on the lamp holder and the interaction between the datum structure and the locating surfaces.

Figure 5:
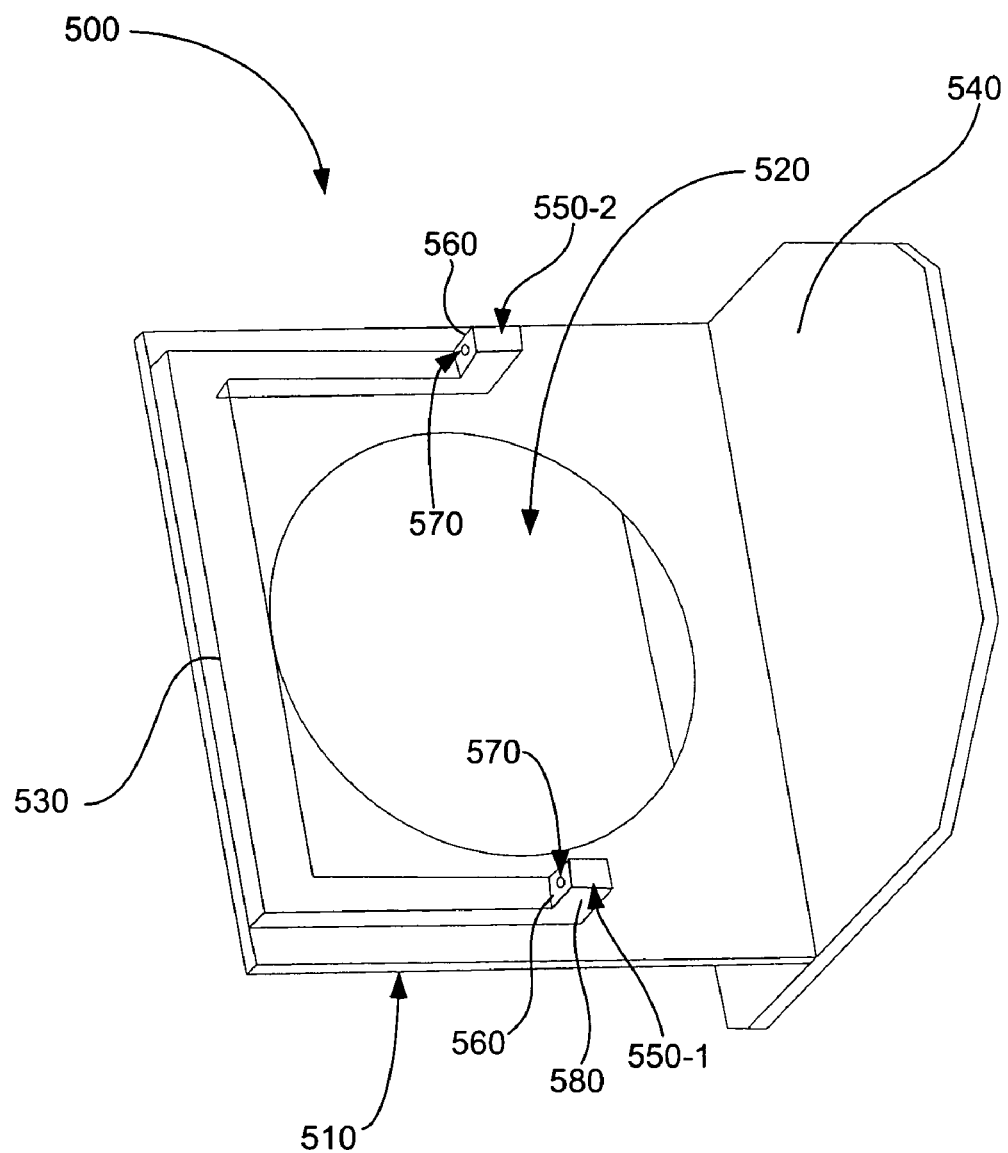
FIG. 5 illustrates a perspective view of an exemplary lamp holder.

FIG. 5 is a perspective view of an exemplary lamp holder (500). The lamp holder (500) includes a guide plate (510) with a lamp opening (520) defined therein, and a locating bar (530) coupled to the guide plate (510) and partially surrounding the lamp opening (520), and a stopper plate (540).

The locating bar (530) includes a plurality of locating tabs (550-1, 550-2) on opposing sides of the lamp opening (520). These locating tabs (550-1, 550-2) help ensure proper location and orientation of the lamp holder (500) when the lamp holder (500) is coupled to the lamp receiver (100). In particular, the locating tabs (550-1, 550-2) each include a z-axis location surface (560). Further, each locating tab (550-1, 550-2) has a fastener hole (570) defined therein and sized to allow a fastener, such as a bolt or screw, to pass through.

Additionally, the lower locating tab (550-1) includes a y-axis location surface (580). The interaction of these locating surfaces is shown in FIGS. 6 and 7, as well as the orientation and alignment of a lamp holder with respect to the lamp receiver (100).

Figure 6:
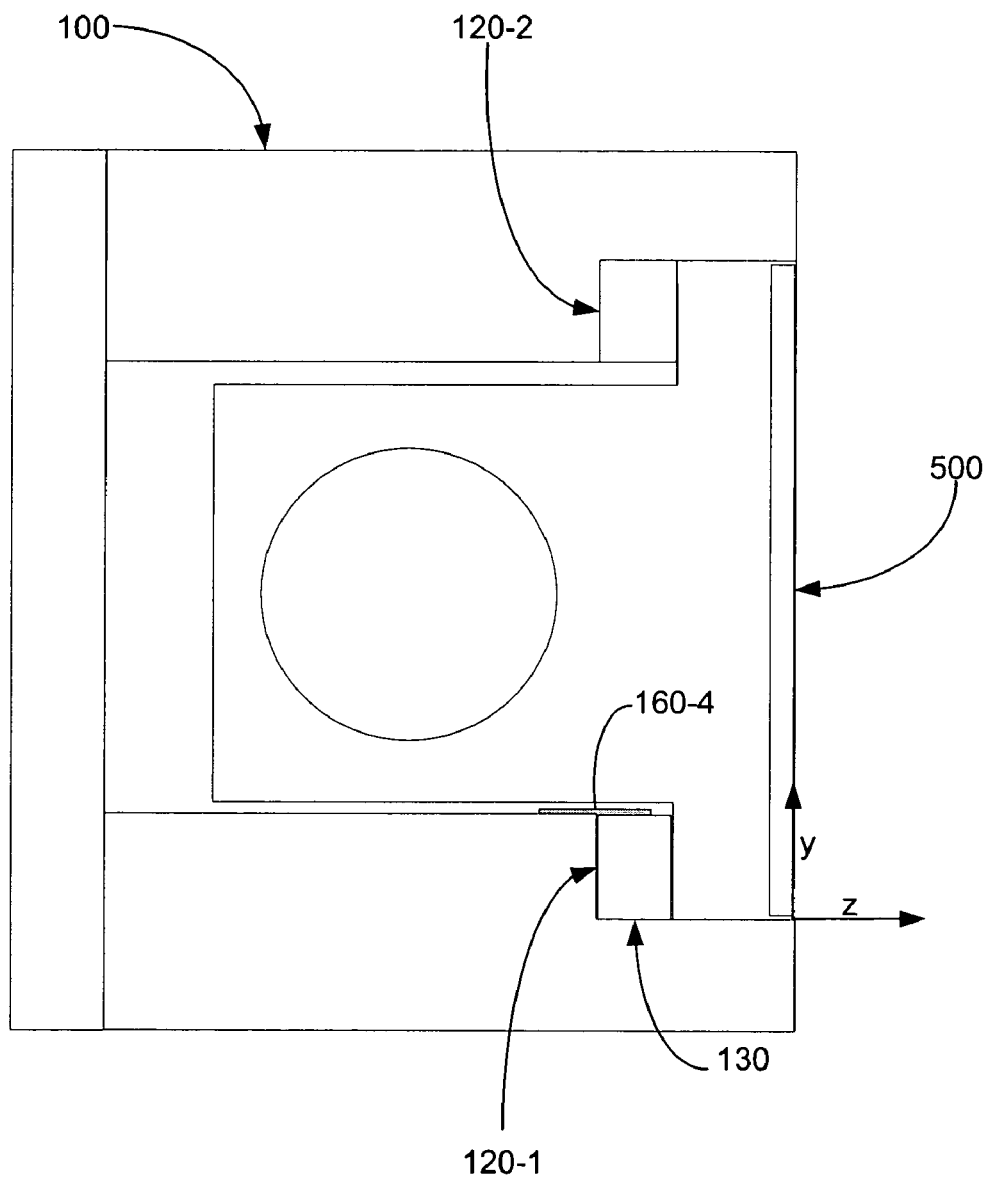
FIG. 6 illustrates a side view of an exemplary lamp receiver with an exemplary lamp holder coupled thereto.
Figure 7:
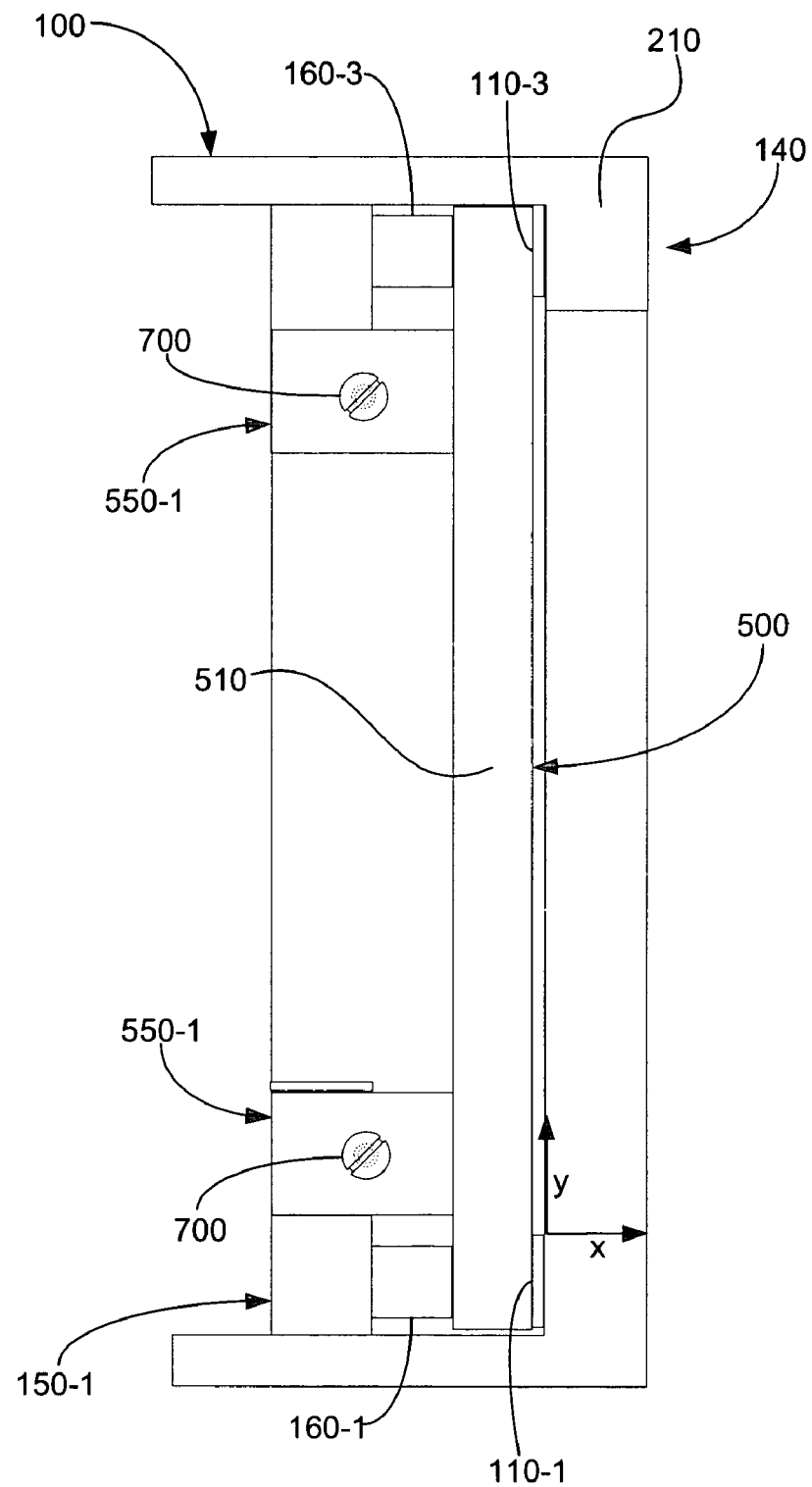
FIG. 7 illustrates a front view of an exemplary lamp receiver with an exemplary lamp holder coupled thereto.

FIG. 6 shows a side view of the lamp receiver (100) with the lamp holder (500) coupled thereto. The lamp holder (500) is aligned with respect to the y-axis of the lamp receiver (100) by placing the y-axis location surface (580; FIG. 5) in contact with the y-axis reference pad (130). As previously discussed, this contact constrains the movement of the lamp holder (500) parallel to the y-axis. The y-axis location surface (580; FIG. 5) is held in contact with the y-axis reference pad (130) by the spring (160-4).

Similarly, the lamp holder (500) is oriented and aligned with respect to the z-axis by placing each z-axis location surface (560; FIG. 5) in contact with a corresponding z-axis reference pad (120-1, 120-2). This contact limits how far the lamp holder (500) can be slid into the lamp receiver (100) and helps ensure the lamp holder is properly aligned about the x-axis.

Further, this contact orients and aligns the lamp holder (500) with respect to rotation about axes parallel to the x-axis. As previously discussed, a line is formed between the z-axis reference pads (120-1, 120-2). A line is also formed between the z-axis location surfaces (560; FIG. 5). By placing the z-axis location surfaces (560; FIG. 5) in contact with the z-axis reference pads (120-1, 120-2), these lines become substantially parallel or collinear. The orientation of the line between the z-axis reference pads (120-1, 120-2) is known to be substantially orthogonal to the z-axis and parallel to the y-axis. Consequently, placing the z-axis location surfaces (560; FIG. 5) in contact with the z-axis reference pads (120-1, 120-2) controls the alignment of the lamp holder (500) about axes parallel to the x-axis of the lamp receiver (100).

The z-axis location surfaces (560) are held in contact with the z-axis reference pads (120-1, 120-2) with fasteners (700) as shown in FIG. 7. The fasteners (700) extend through the fastener holes (570; FIG. 5) and into the mounting holes (170; FIG. 1). The thread diameter of the fasteners (700) is smaller than the diameter of the fastener holes (570). The difference in size between the thread diameter of the fasteners (700) and the fastener holes (570) is large enough to allow the lamp holder (500) to move slightly parallel to the y-axis and the x-axis. Accordingly, this difference in size allows the fasteners (700) to maintain the z-axis location surfaces (560) in contact with the z-axis reference pads (120-1, 120-2; FIG. 6) without substantially affecting the alignment of the lamp holder (500) with respect to the x-axis or y-axis of the lamp receiver (100).

In addition, the alignment of the lamp holder (500) with respect to the lamp receiver (100) minimizes the misalignment effects of torquing the fasteners (700). If the fasteners (700) have right hand threads, the fasteners (700) are torqued by rotating them clockwise. As the fasteners (700) are tightened to the locating tabs (550-1, 550-1), friction between the fasteners (700) and the locating tabs (550-1, 550-2) tends to cause the lamp holder (500) to twist as well. This rotation is resisted by the upper member (210) of the first guide member (140) and the lower springs (160-1, 160-2) on the lower second guide member (150-1). This resistance minimizes the effects of over tightening the fasteners (700). In addition, the fasteners (700) may be shoulder screws with a known spring force, which minimizes the possibility of over tightening the fasteners (700).

The alignment and orientation of the lamp holder (500) with respect to movement parallel to the x-axis of the lamp receiver (100) and rotation about axes parallel to the y and z axes of the lamp receiver (100) is constrained by placing the guide plate (510) in contact with the x-axis alignment surfaces (110-1, 110-2, 110-3).

As previously discussed the x-axis reference pads (110-1, 110-2, 110-3) define a plane, as any three points define a plane. This plane is substantially parallel to the plane designated as the y-z plane according to the chosen coordinate system. The surface of the guide plate (510) also defines a plane. Accordingly, placing the guide plate (510) in contact with the x-axis reference pads (110-1, 110-2, 110-3) constrains the rotation of the lamp holder (500) about axes parallel to both the y-axis or the z-axis as well as constraining the alignment of the lamp holder (500) with respect to movement parallel to the x-axis.

As previously discussed, the datum features, which include the x-axis reference pads (110-1, 110-2, 110-3), the z-axis reference pads (120-1, 120-2), and the y-axis reference pad (130) are formed directly on the lamp receiver (100). The relatively small size of the reference pads helps ensure that the reference pads will come into contact with the same parts of a given lamp holder (500). As a result, a lamp holder (500) may be placed in and taken out of the lamp receiver (100) multiple times without substantially affecting the alignment of the lamp holder (500) with respect to the lamp receiver (100) when the lamp holder (500) is coupled thereto. Consequently, the accuracy of the alignment of the lamp holder (500) depends in large part on the accuracy with which the lamp holder is formed.

Figure 8:
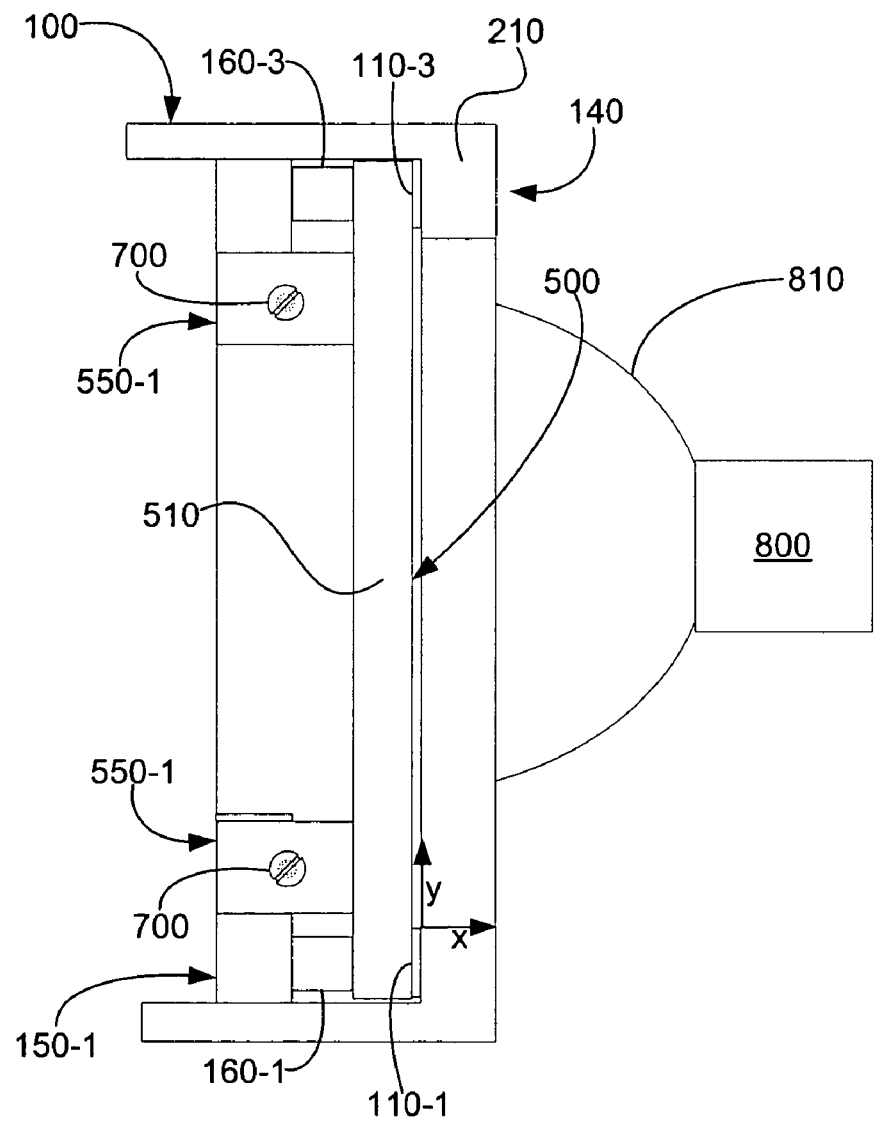
FIG. 8 illustrates a front view of an exemplary lamp receiver with an exemplary lamp holder, an exemplary reflector, and lamp coupled thereto.

FIG. 8 shows a lamp (800) and reflector (810) coupled to the lamp holder (500). The lamp holder (500) is shown coupled to the lamp receiver (100). The lamp (800) may be of any type that produces sufficient light for projection and/or television applications. An example of a lamp is an ultra-high pressure (UHP) mercury arc lamp. For ease of reference, a UHP lamp will be described in the illustrated implementation.

The lamp (800) creates a fireball in a central portion of a mercury vapor or other vapor-filled tube that results in the generation of a plasma caused by an arc across first and second electrodes. The arc is created by a voltage difference or potential across the first and second electrodes. The potential difference is caused by providing potentials of different polarities to each of the first and second electrodes. Any suitable source may be used to provide the potential difference.

The lamp (800) is aligned with respect to the reflector (810) such that the lamp (800) is placed in an optimal position within the reflector (800). In some embodiments, the optimal position of the lamp (800) places the fireball generator at the focal point of the reflector (800) when the fireball is active.

Figure 9:
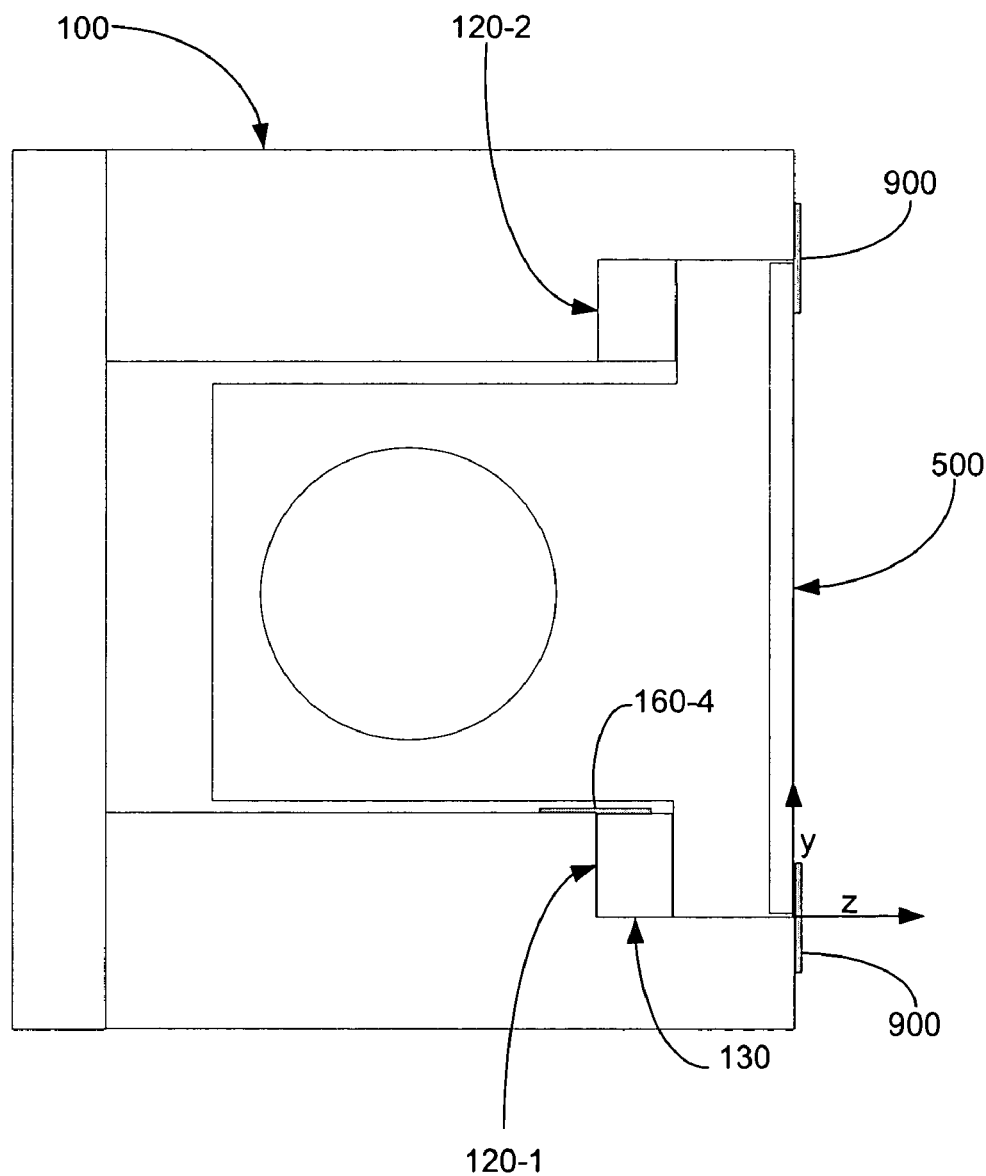
FIG. 9 illustrates a side view of an exemplary lamp receiver with an exemplary lamp holder coupled thereto.

While one exemplary lamp receiver (100) has been shown and described, the datum structure can be incorporated into a projector system in several ways as best fits a particular design. For example, the fasteners (700) may be replaced with additional springs (900) as shown in FIG. 9. The springs (900) provide a biasing force against the lamp holder (500) in order to maintain the z-axis location surfaces (570-1, 570-2) in contact with the z-axis reference pads (120-1, 120-2) and the y-axis location surface (580) in contact with the y-axis reference pad (130). As previously discussed, this contact helps align the lamp holder (500) to the lamp receiver (100).

Figure 10:
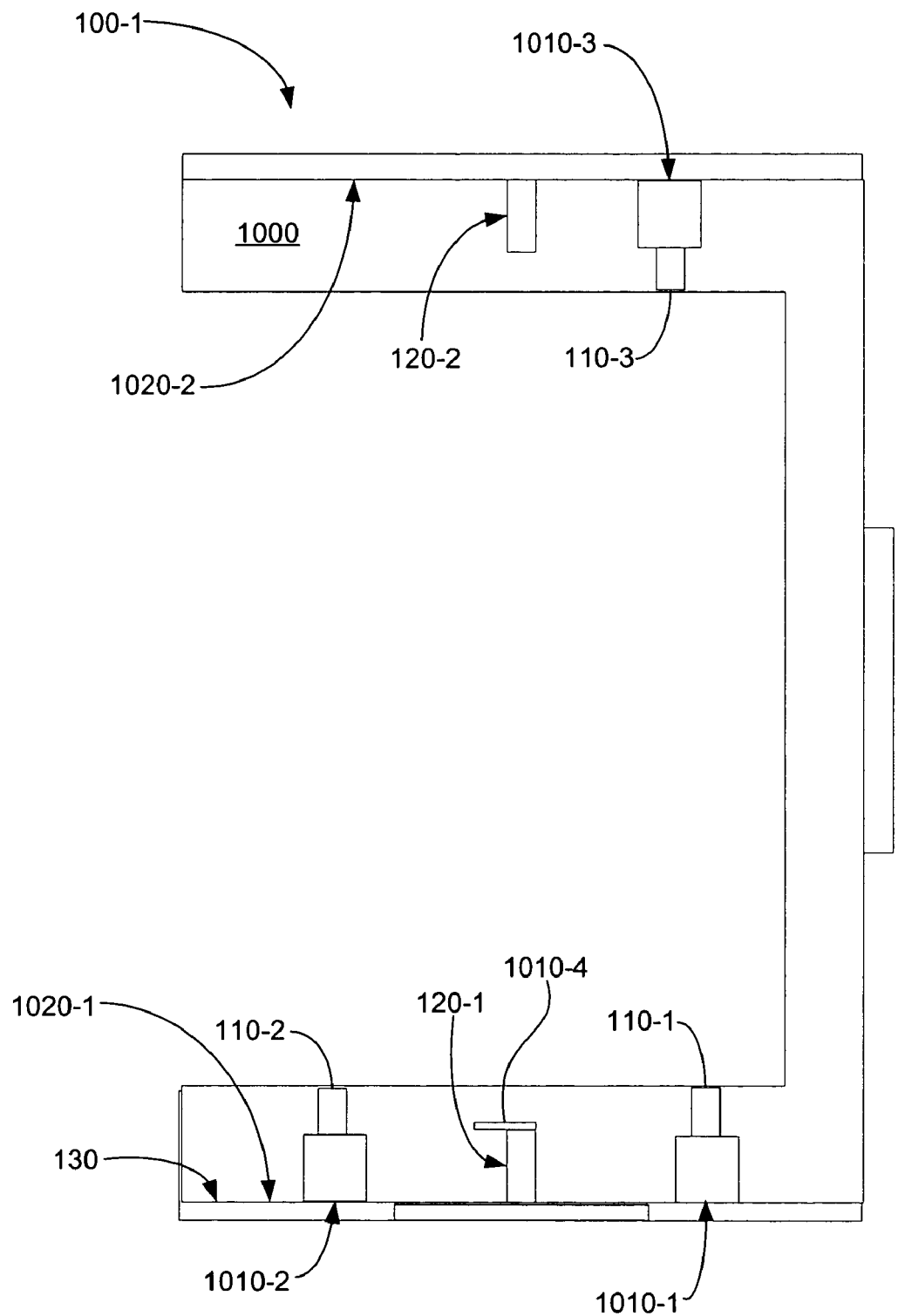
FIG. 10 illustrates a rear view of an exemplary lamp receiver.
Figure 11:
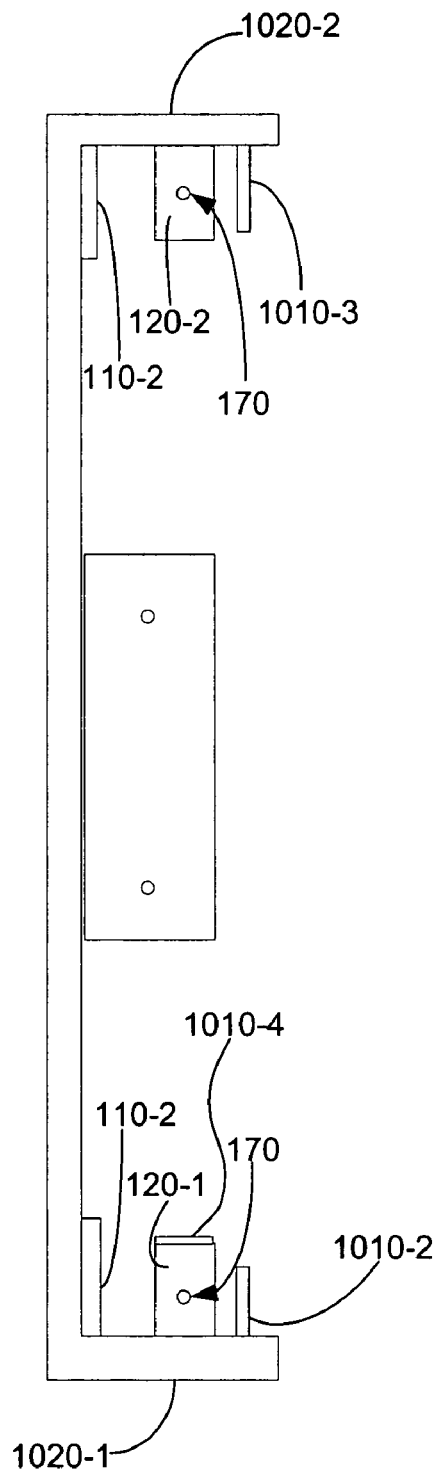
FIG. 11 illustrates a front view of an exemplary lamp receiver.

FIGS. 10–11 illustrate another exemplary lamp receiver (100-1) that minimizes alignment errors due to variations in the thickness of the guide plate (510; FIG. 5). The lamp receiver (100-1) includes a single mounting plate (1000). A lamp holder is coupled to the single mounting plate (1000), rather than being located between first and second guide members (140, 150; FIG. 1) as discussed with reference to FIGS. 1–9. Instead, each of the reference pads are formed on the mounting plate (1000), as will now be discussed.

Three x-axis reference pads (110-1, 110-2, 110-3) are formed on the mounting plate (1000). As previously discussed, placing a lamp holder in contact with the x-axis reference pads (110-1, 110-2, and 110-3) constrains the translation of a component parallel to the x-axis and with respect to rotation about axes parallel to the y and z-axes. The lamp receiver (100) includes a plurality of springs (1010-1, 1010-2, 1010-3) to maintain a component in contact with the x-axis reference pads (110-1, 110-2, 110-3).

These springs (1010-1, 1010-2, 1010-3) are coupled to the mounting plate (1000) adjacent the x-axis reference pads (110-1, 110-2, 110-3) and are sized slightly smaller than the nominal size of the guide plate (510) of a lamp holder (500). Accordingly, the lamp holder (500) may be coupled to the mounting plate (1000) at these three points. As a result, when the lamp holder (500) is placed in contact with the rest of datum reference pads, only the portion of the guide plate (510) at these points is in contact with the springs (1010-1, 1010-2, 1010-3). As a result, variations in the thickness of the guide plate (510) do not substantially affect the orientation or alignment of the lamp holder (500). The rest of the datum structure will now be discussed in more detail.

The mounting plate (1000) also includes a plurality of flanges (1020-1, 1020-2, 1020-3). These flanges are formed orthogonally to the mounting plate (1000) and may be integrally formed therewith. The first or bottom flange (1020-1) includes a y-axis reference pad (130), which constrains the motion of a component in contact therewith parallel to the y-axis, as previously discussed. In addition, each of the flanges (1020-1, 1020-2, 1020-3) may have z-axis references pads formed thereon.

If the datum structure of the lamp receiver (100-1) is kinematically constrained, the first and second flanges (1020-1, 1020-2) may have the z-axis reference pads (120-1, 120-2) formed thereon. The z-axis reference pads (120-1, 120-2) may be formed orthogonally to the flanges (1020-1, 1020-2), such that the z-axis reference pads (120-1, 120-2) the mounting plate (1000), the x-axis reference pads (110-1, 110-2, 110-3), and the flanges are all formed on mutually orthogonal planes. As a result, these components may be formed by a machine tool making use of the machine tool's most accurate path, which allows for increased repeatability and accuracy in forming either a mold for forming the lamp receiver or in forming a lamp receiver directly.

The function of the lamp receiver (100-1) will now be discussed, with reference to the lamp holder (500; FIG. 5) that was discussed with reference to FIG. 5. The guide plate (510) is placed in contact with the x-axis reference pads (110-1, 110-2, 110-3) and is held in contact by the springs (1010-1, 1010-2, 1010-3) and a fourth spring (1010-4) that biases the lamp holder (500) against the y-axis reference pad (130).

If the lamp holder (500) is to be kinematically constrained, springs are used to couple the locating tabs (560) to the z-axis reference pads (120-1, 120-2) or semi-kinematically with fasteners using the mounting holes (170) as previously discussed. Consequently, the motion of the lamp holder (500) is fully constrained and aligned with respect to the lamp receiver.

In operation, the lamp holder (500) heats up and expands. As previously discussed, the lamp holder (500) is held in contact with the lamp receiver (100, 100-1) by springs and/or fasteners. The location of the reference pads is such that the reference pads are located in substantially symmetric relationships. As a result, if the thermal expansion affects each side of the lamp holder (500) equally, the thermal expansion will not substantially change the orientation and alignment of the lamp holder (500) with respect to the lamp receivers (100, 100-1). In other words, lamp receivers (100, 100-1) may be symmetrically formed such that their alignment is athermal.

Figure 12:
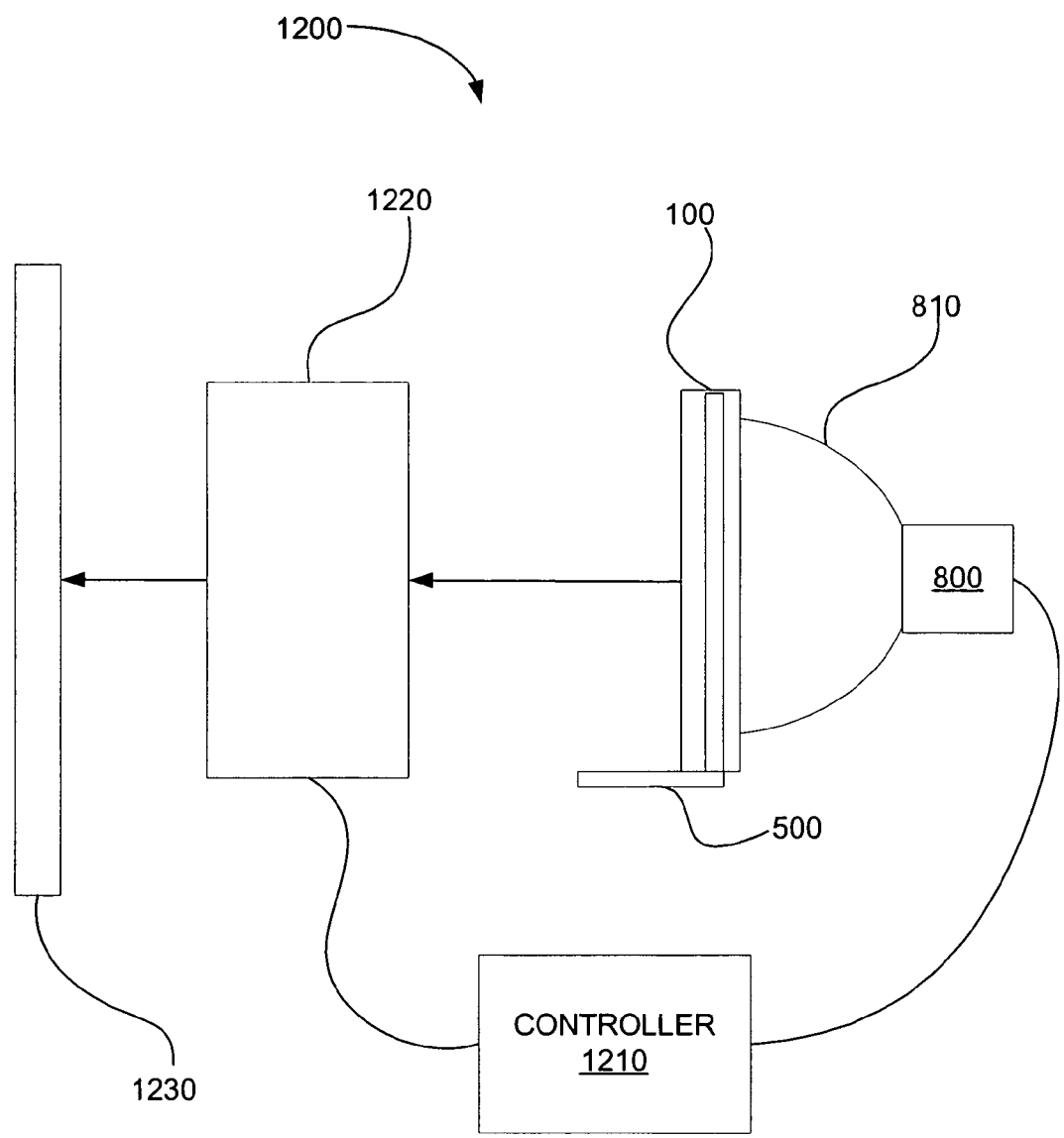
FIG. 12 is a schematic illustration of a display system that includes a lamp receiver.

FIG. 12 is a schematic illustration of a display system (1200) that includes a lamp receiver (100). A lamp holder (500) is coupled to the lamp receiver (100) as previously described. Further, other lamp receivers, such as lamp receiver (100-1) may be used. As shown, the lamp holder also has a lamp (800) and reflector (810) coupled thereto. A controller (1210) is coupled to a projection assembly (1220), which may be a spatial light modulator (SLM) such as a liquid crystal display (LCD), a liquid crystal on silicon (LCOS), or a digital mirror device (DMD) type projection assembly. The controller (1210) also controls the lamp (800).

In operation, the controller (1210) activates the lamp (800) which generates light. The light is directed from the lamp (800) to the projection assembly (810) by the reflector (810). Light from the lamp (800) is modulated by the projection assembly (1220) to form an image that is then projected onto a viewing surface (1230). The use of an exemplary lamp receiver (100, 100-1) in the display system (1200) helps improve the quality of the projection image, in part because more of the light produced by the lamp (800) is available to the projection assembly (1220) due to the improved alignment and orientation of the lamp (800) and the lamp holder (500).

In conclusion, a lamp receiver includes a datum structure for aligning and orienting a component coupled thereto and for maintaining that alignment. This structure includes a plurality of datum reference pads. By placing a component in simultaneous contact with each of the datum reference pads, the alignment and orientation of the component is fully constrained and aligned. This contact may be maintained by any suitable means, including springs and/or fasteners. This configuration, including the use of relatively small reference pads, which allows any given lamp to be rapidly and reliably coupled to the lamp receiver, and hence makes such a projector system easier to use.

Further, variations in the alignment of the lamp holder with respect to the lamp receiver may be minimized, which increases the efficiency of the projector system. Further, such a datum structure may be reliable formed because each of the reference pads may be formed on mutually orthogonal planes, which allows for rapid and reliable formation of molds or lamp receivers with conventional machine tools.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the invention be defined by the following claims.

What is claimed is:

1. A lamp receiver for use in projector systems, comprising:
   a first member for engaging a lamp holder assembly, said assembly comprising a lamp holder coupled with a lamp and reflector; and
   a datum structure having a plurality of reference surfaces that abut and constrain movement of said lamp holder assembly, said datum structure comprising a plurality of first reference surfaces for alignment of said lamp holder assembly with respect in a first direction, a plurality of second reference surfaces for alignment of said lamp holder assembly in a second direction, and at least one third reference surface for alignment of said lamp holder assembly in a third direction wherein said first, second and third directions are mutually orthogonal.

2. The lamp receiver of claim 1, wherein said first reference surfaces, said second reference surfaces, and said third reference surfaces are on mutually orthogonal planes.

3. The lamp receiver of claim 2, wherein said second reference surfaces and said third reference surface are formed on said first member.

4. The lamp receiver of claim 3, and further comprising a plurality of biasing members coupled to said first member adjacent said first reference surfaces for maintaining a component in contact with said first reference surfaces.

5. The lamp receiver of claim 3, wherein said first member includes a mounting plate and a plurality of flanges orthogonal to said mounting plate.

6. The lamp receiver of claim 5, wherein said first reference surfaces are formed on said mounting plate and said second reference surfaces are formed on said flanges.

7. The lamp receiver of claim 6, wherein said second reference surfaces each have a mounting hole defined therein.

8. The lamp receiver of claim 2, and further comprising a second member, separate and spaced apart from said first member, and having said second reference surfaces and said third reference surfaces formed thereon.

9. The lamp receiver of claim 8, and further comprising first biasing members coupled to said second member for biasing maintaining a component coupled to said lamp receiver in contact with said first reference surfaces.

10. The lamp receiver of claim 9, wherein said first biasing members comprise springs.

11. The lamp receiver of claim 8, and further comprising a second biasing member coupled to said second member for maintaining a component coupled to said lamp receiver in contact with said third reference surface.

12. The lamp receiver of claim 11, wherein said second biasing member is a spring.

13. The lamp receiver of claim 8, wherein said second reference surfaces each have a mounting hole defined therein.

14. The lamp receiver of claim 1, comprising exactly three first reference surfaces, exactly two second reference surfaces and a single third reference surface.

15. A lamp receiver configured to have a lamp holder coupled thereto, comprising:
   a first member;
   a plurality of flanges coupled to said first member and being orthogonal to said first member; and
   a plurality of first reference surfaces formed on said first member to abut said lamp holder and align said lamp holder in a first direction;

a plurality of second reference surfaces formed on said each of said flanges to abut said lamp holder and align said lamp holder in a second direction;

and at least one third surface formed on at least one of said flanges to abut said lamp holder and align said lamp holder in a third direction.

16. The lamp receiver of claim 15, and wherein said first reference surfaces, said second reference surfaces, and said third reference surfaces are mutually orthogonal.

17. The lamp receiver of claim 15, and further comprising at least mounting hole defined in each of said second reference surfaces and configured to have a fastener coupled thereto for maintaining said lamp holder in contact with each of said second reference surfaces.

18. The lamp receiver of claim 15, and further comprising a plurality of biasing members coupled to said first member for maintaining said lamp holder in contact with said first reference surfaces.

19. A lamp receiver configured to have a lamp holder coupled thereto, comprising:

a first member;

a plurality of first reference surfaces for alignment with respect in a first direction formed on said first member;

a second member spaced apart from said first member;

a plurality of second reference surfaces for alignment in a second direction formed on said second member;

and at least one third surface for alignment in a third direction formed on said second member.

20. The lamp receiver of claim 19, and further comprising at least one mounting hole defined in each of said second reference surfaces.

21. The lamp receiver of claim 19, and further comprising a plurality of biasing members coupled to said second member for biasing a component coupled to said lamp receiver to contact said plurality of first reference surfaces.

22. The lamp receiver of claim 19, wherein said reference surfaces constrain movement of a lamp holder with respect to six degrees of freedom.

23. A display system, comprising:

a lamp receiver having a datum structure having a plurality of first reference surfaces for alignment with respect in a first direction, a plurality of second reference surfaces for alignment in a second direction, and at least one third surface for alignment in a third direction wherein said first, second and third directions are mutually orthogonal;

a lamp holder having a lamp and a reflector coupled, said lamp holder being aligned by abutment with said reference surfaces; and a projection assembly.

24. The display system of claim 23, wherein said projection assembly includes a spatial light modulator.

25. The display system of claim 24, wherein said spatial light modulator comprises a liquid crystal display.

26. The display system of claim 24, wherein said spatial light modulator comprises a liquid crystal on silicon display.

27. The display system of claim 24, wherein said spatial light modulator comprises a digital mirror device.

28. A lamp receiver for use in projector systems, said lamp receiver being configured to coupled with a lamp holder, said receiver comprising:

a first member; and means for providing alignment of said lamp holder with respect to a first direction, means for providing alignment with respect to a second direction, and means for providing alignment with respect to a third direction, such that said lamp holder is constrained from movement in six degrees of freedom comprising three mutually orthogonal degrees of freedom and three rotational degrees of freedom about said mutually orthogonal degrees of freedom.

29. The lamp receiver of claim 28, and further comprising means for maintaining a component in simultaneous contact with said means for securing alignment with respect to said first, second, and third directions.

30. The lamp receiver of claim 28, and further comprising means for receiving a fastener defined in said means for providing alignment in said second direction.

* * * * *